US012591834B2

(12) United States Patent
Joyce et al.

(10) Patent No.: US 12,591,834 B2
(45) Date of Patent: Mar. 31, 2026

(54) SYSTEM AND METHOD FOR PREDICTING FOOD PRODUCT SALES UTILIZING A PLURALITY OF ARTIFICIAL-INTELLIGENCE SUB-MODELS

(71) Applicant: ZS Associates, Inc., Evanston, IL (US)

(72) Inventors: Tim Joyce, Chicago, IL (US); Srinivas Chilukuri, Buffalo Grove, IL (US); Russell Evans, Evanston, IL (US); Sharayu Rane, Maharashtra (IN); Shubhendu Trivedi, Yonkers, NY (US); Abhishek Rathi, Seattle, WA (US); Chenguang Xue, Princeton, NJ (US); Brian Thompson, Barrington, IL (US)

(73) Assignee: ZS Associates, Inc.

( * ) Notice: Subject to any disclaimer, the term of this patent is extended or adjusted under 35 U.S.C. 154(b) by 178 days.

(21) Appl. No.: 17/973,733

(22) Filed: Oct. 26, 2022

(65) Prior Publication Data

US 2023/0139999 A1      May 4, 2023

(30) Foreign Application Priority Data

Oct. 29, 2021    (IN) .............................. 202141049781

(51) Int. Cl.
*G06Q 10/0639* (2023.01)
(52) U.S. Cl.
CPC ................................ *G06Q 10/0639* (2013.01)

(58) Field of Classification Search
CPC .. G06Q 30/0202; G06Q 10/087; G06Q 10/08; G06Q 30/0206; G06Q 10/06375
See application file for complete search history.

(56) References Cited

U.S. PATENT DOCUMENTS

| | | | |
|---|---|---|---|
| 7,890,387 B2 * | 2/2011 | Bayer | G06Q 10/0875 |
| | | | 705/28 |
| 8,738,421 B1 * | 5/2014 | Ali | G06Q 30/0223 |
| | | | 705/28 |
| 11,816,122 B1 * | 11/2023 | He | G06N 20/20 |
| 12,008,497 B2 * | 6/2024 | Makhija | G06N 3/044 |
| 2006/0235965 A1 * | 10/2006 | Bennett | G06Q 30/02 |
| | | | 709/224 |

(Continued)

OTHER PUBLICATIONS

Boyapati, Sai Nikhil Sai et al., Predicting sales using Machine Learning Techniques Blekinge Institute of Technology, May 2020 (Year: 2020).*

(Continued)

*Primary Examiner* — Scott L Jarrett
(74) *Attorney, Agent, or Firm* — Foley & Lardner LLP

(57) ABSTRACT

Disclosed herein are methods and systems for predicting and projecting market performance for a product or a concept using a suite of artificial intelligence models. In a non-limiting example, a method comprises receiving, by a processor, one or more attributes of a product; executing, by the processor, a computer model to generate a projected attribute indicating a projected market performance metric of the product within a defined time period, the computer model being trained in accordance with a set of historical products and their corresponding market performance metrics; presenting, by the processor, the projected attribute.

14 Claims, 18 Drawing Sheets

400

(56)     References Cited

U.S. PATENT DOCUMENTS

| | | | |
|---|---|---|---|
| 2011/0004509 A1* | 1/2011 | Wu ................... G06Q 30/0631 | |
| | | | 705/26.7 |
| 2013/0066675 A1* | 3/2013 | Bercaw ............. G06Q 30/0201 | |
| | | | 705/7.29 |
| 2014/0278778 A1* | 9/2014 | Regan ................... G06Q 10/04 | |
| | | | 705/7.31 |
| 2016/0260110 A1* | 9/2016 | Ray ................. G06Q 10/06315 | |
| 2017/0169446 A1* | 6/2017 | Li ....................... G06Q 30/0202 | |
| 2020/0090113 A1* | 3/2020 | Mahalanobish ..... G06Q 10/047 | |
| 2020/0134640 A1* | 4/2020 | Morgan ............. G06Q 30/0202 | |
| 2020/0184494 A1* | 6/2020 | Joseph ................. G06F 18/214 | |
| 2021/0125207 A1* | 4/2021 | Banerjee ................ G06Q 10/04 | |
| 2022/0036388 A1* | 2/2022 | Ghionda ........... G06Q 30/0202 | |
| 2022/0067610 A1* | 3/2022 | Aggarwal .......... G06Q 30/0202 | |
| 2022/0122101 A1* | 4/2022 | Thirunavukkarasu ....................... | |
| | | | G06N 20/00 |
| 2022/0292533 A1* | 9/2022 | Oosugi ............. G06Q 30/0204 | |
| 2022/0318711 A1* | 10/2022 | Recasens ........ G06Q 10/06315 | |
| 2022/0335314 A1* | 10/2022 | Doan Huu ............. G06N 20/00 | |
| 2022/0351223 A1* | 11/2022 | Vankadaru ............. G06N 20/00 | |
| 2022/0414690 A1* | 12/2022 | Stohr .................... G06Q 10/04 | |

OTHER PUBLICATIONS

Tsoumakas, Grigoris, A survey of machine learning techniques for food sales prediction Artificial intelligence Review, 2019 (Year: 2019).*

\* cited by examiner

400

Receiving attribute of a proposed product. 402

Executing a suit of models using the received attributes to predict one or more performance metrics for the proposed product. 404

Displaying projected performance metric. 406

| Atlas Profiles | Categories | Key UPCs (# UPCs / $ Sales in 2020 / 2 Yr CAGR) | Category Performance ($ Sales in 2020 / 2 Yr CAGR) | Growth Rate Lift |
|---|---|---|---|---|
| Low Sugar Claim + Dairy Free Claim | Frozen Meals | 3 / $13.5M / 28% | $9.2B / 1% | *28.0x* |
| | Sandwich Cheese & Cooking Cheese | 16 / $86.0M / 44% | $5.8B / 3% | *14.7x* |
| Pork Ingredient + High Protein Claim + Low Sugar Claim | Frozen Meals | 3 / $2.7M / 27% | $9.2B / 1% | *27.0x* |
| | Cold Cuts & Hot Dogs | 76 / $173.4M / 24% | $6.1B / 4% | *6.0x* |
| Monterey Jack Cheese Ingredient + Vinegar Ingredient | Mexican Foods & Sauces | 4 / $15.0M / 46% | $5.0B / 10% | *4.6x* |

Design Experiment

Bars Concept Forecasting - $M

| Price | Apple | Blueberry | Cranberry | Strawberry | Vanilla |
|---|---|---|---|---|---|
| $1.49 | $1.8 | $2.9 | $1.9 | $1.8 | $1.8 |
| $1.55 | $2.1 | $3.2 | $2.2 | $2.1 | $2.1 |
| $1.59 | $2.2 | $3.3 | $2.3 | $2.2 | $2.2 |
| $1.65 | $2.4 | $3.7 | $2.5 | $2.4 | $2.4 |
| $1.69 | $2.4 | $3.6 | $2.5 | $2.4 | $2.3 |
| $1.75 | $2.4 | $3.6 | $2.5 | $2.4 | $2.3 |
| $1.79 | $2.4 | $3.6 | $2.5 | $2.4 | $2.3 |
| $1.85 | $2.4 | $3.6 | $2.5 | $2.3 | $2.3 |
| $1.89 | $2.4 | $3.6 | $2.5 | $2.3 | $2.4 |
| $1.95 | $2.4 | $3.5 | $2.5 | $2.4 | $2.4 |
| $1.99 | $2.5 | $3.5 | $2.6 | $2.4 | $2.4 |
| $2.05 | $2.4 | $3.5 | $2.5 | $2.4 | $2.4 |
| $2.09 | $2.4 | $3.1 | $2.5 | $2.4 | $2.3 |
| $2.15 | $2.4 | $2.4 | $2.5 | $2.4 | $2.3 |
| $2.19 | $2.3 | $2.3 | $2.6 | $2.4 | $2.3 |

FIG. 5H

| Concept | Sales | POSITIVE | NEUTRAL | NEGATIVE |
|---|---|---|---|---|
| Pizza X – SKU 1 | $18.0M | • Mozzarella<br>• Parmesan<br>• Crispy<br>• Cheesy | • Sweet Potato Flour<br>• Onion<br>• Pepperoni<br>• Tomato Sauce | • Granulated Garlic<br>• Extra Virgin Olive Oil |
| Pizza X – SKU 2 | $16.6M | • Mozzarella<br>• Italian Sausage | • Unbleached Flour<br>• Tomato Sauce | • Flavoring: Salt, Sugar, Granulated Garlic |
| Pizza X – SKU 3 | $12.5M | • Parmesan Cheese<br>• Authentic | • Unbleached Flour<br>• Family-size | • Meatball<br>• Basil |
| Pizza X – SKU 4 | $6.6M | • Smoky<br>• Onion Powder | • Unbleached Flour<br>• Barbeque Sauce | • Organic<br>• Natural Flavor |

FIG. 5I

| Forecast Parameter | Forecast 1 | Forecast 2 | Forecast 3 |
|---|---|---|---|
| First Year Sales ($M) | $21 | $22 | $28 |
| First Year Units (M) | 4.2 | 3.4 | 3.8 |
| Price | $5.01 | $6.49 | $7.29 |

SYSTEM AND METHOD FOR PREDICTING FOOD PRODUCT SALES UTILIZING A PLURALITY OF ARTIFICIAL-INTELLIGENCE SUB-MODELS

CROSS REFERENCE TO RELATED APPLICATIONS

This application claims the benefit of and priority to Indian Provisional Patent Application No. 202141049781, filed Oct. 29, 2021, which is incorporated herein by reference in its entirety for all purposes.

TECHNICAL FIELD

This application relates generally to training, calibrating, and executing artificial intelligence models.

BACKGROUND

New Product forecasting is currently a very slow, expensive, inefficient, and inaccurate process for consumer goods manufacturers. Currently, manufacturers must deliver a new product concept or a proposal of a new product concept to reviewers and then wait several weeks for qualitative consumer feedback. Conventionally, a human analyst requests feedback from a representative sample of potential consumers (e.g., human reviewers who test the new product or opine on whether they would consume the new product). The human analysis may then use their subjective skills and understanding to determine whether the concept will be successful. Not only this process is tedious, time-consuming, and expensive, it is also unreliable because the results depend directly on the human reviewer's subjective skills and understanding. Conventionally, reviewers generally view a concept or specification of a new product to provide qualitative feedback. The analyst then aggregates different reviewer's feedback to build projections about sales and performance of the new products/concepts. Many analysts have built a variety of analytical approaches to extrapolate performance from the above-described process. However, these approaches are unreliable because they can be easily manipulated by brands who claim they will provide more marketing support than they intend to. Additionally, conventional approaches depend upon reviewers who don't always have a good sense for what they will or won't like. Therefore, different reviewers may predict different performance projections or marketing requirements for the same product.

SUMMARY

For the aforementioned reasons, there is a need to use real consumer behaviors to remove subjectivity of the conventional approaches (e.g., to intelligently analyze data and generate results efficiently and reliably). There is also a need to predict results faster and less expensively. Using the methods and systems described herein, an AI-backed performance prediction system can analyze data and predict accurate and reliable results in seconds, as opposed to conventional methods that produce (sometimes) inaccurate and unreliable results in weeks.

Using the methods and systems discussed herein, the AI-backed performance prediction system can determine benefits and attributes/ingredients sought by consumers. For instance, the system can determine what combinations of product attributes will be more successful for a new product.

The system can also analyze ideas for new products (e.g., eliminate low-value ideas to increase resources for the most promising ideas), formulate new products (e.g., define key ingredients and nutrition fact guardrails), launch forecast and planning for new/proposed products (e.g., predict distribution values and sales metrics based on attributes of a new product to be launched), optimize price and promotion strategy (e.g., identify suitable product claims and packaging claims).

Using the methods and systems described herein, the AI-backed performance prediction system can provide guidance on what elements to emphasize when marketing a new product. For instance, the AI-backed performance prediction system can recommend emphasizing certain nutritional values, convenience, and/or fulfillment enjoyment values of the product. Specifically, the system may recommend marketing messages regarding the high-quality and homemade taste of the product (e.g., communicating that the product brings families together and feeds even the pickiest eaters, or leaves the entire family feeling full and satisfied). In another example, the system may recommend using preparation convenience as the main marketing strategy/message (e.g., communicating that consumers only need one appliance to cook the product).

Using the methods and systems described herein, the AI-backed performance prediction system can provide insights on choosing a brand under which a product should be marketed, profit-maximizing price points, and which of the developed flavors would fare best a launch set. For instance, the system may recommend that a new brand is likely to generate 30% more sales than a legacy brand. The system may also recommend increasing the price by a certain amount without affecting sales or consumer sentiment. The system may also identify the best number of units per container to improve market performance.

Using the methods and systems described herein, the AI-backed performance prediction system can compare a client's product to a competitor's product and identify insights to recommend improvement opportunities. For instance, the system may determine that a product is suffering a significant market share decline following distribution gains from a competitor. The system may then determine what unmet consumer needs caused the competitor's product to gain a bigger market share, what other unmet consumer needs exist, and what modifications under the client's brand would meet the identified unmet consumer needs and enable the product to recapture market share. For instance, the system may determine that the client's brand equity has not eroded. However, the competitor's brands substantially benefited from a taste change due to a global pandemic. The system may also suggest new claims to be used in marketing to increase market share. The system may output results of various analytical protocols discussed herein and the client (human end user) may interpret the outputs to identify the problem. Typically, end users are aware that market share is declining. However, end users might use the system to diagnose what elements of a product might be negatively affecting the performance and what could be improved to make it more successful.

In an embodiment, a method comprises receiving, by a processor, one or more attributes of a product; executing, by the processor, a computer model to generate a projected attribute indicating a projected market performance metric of the product within a defined time period, the computer model being trained in accordance with a set of historical products and their corresponding market performance metrics; presenting, by the processor, the projected attribute.

In another embodiment, a system comprises a server comprising a processor and a non-transitory computer-readable medium containing instructions that when executed by the processor causes the processor to perform operations comprising: receiving, one or more attributes of a product; executing a computer model to generate a projected attribute indicating a projected market performance metric of the product within a defined time period, the computer model being trained in accordance with a set of historical products and their corresponding market performance metrics; presenting the projected attribute.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which reference numerals identify similar or identical elements. Reference numerals that are introduced in the specification in association with a drawing figure may be repeated in one or more subsequent figures without additional description in the specification to provide context for other features, and not every element may be labeled in every figure. The drawing figures are not necessarily to scale, emphasis instead being placed upon illustrating embodiments, principles, and concepts. The drawings are not intended to limit the scope of the claims included herewith.

FIGS. 4C-4D illustrate examples of training data used to train one or more AI models for the AI-backed performance prediction system, in accordance with one or more implementations; and FIGS. 5A-5J illustrate various graphical user interfaces displayed in an AI-backed performance prediction system, in accordance with one or more implementations.

Figure 1A:
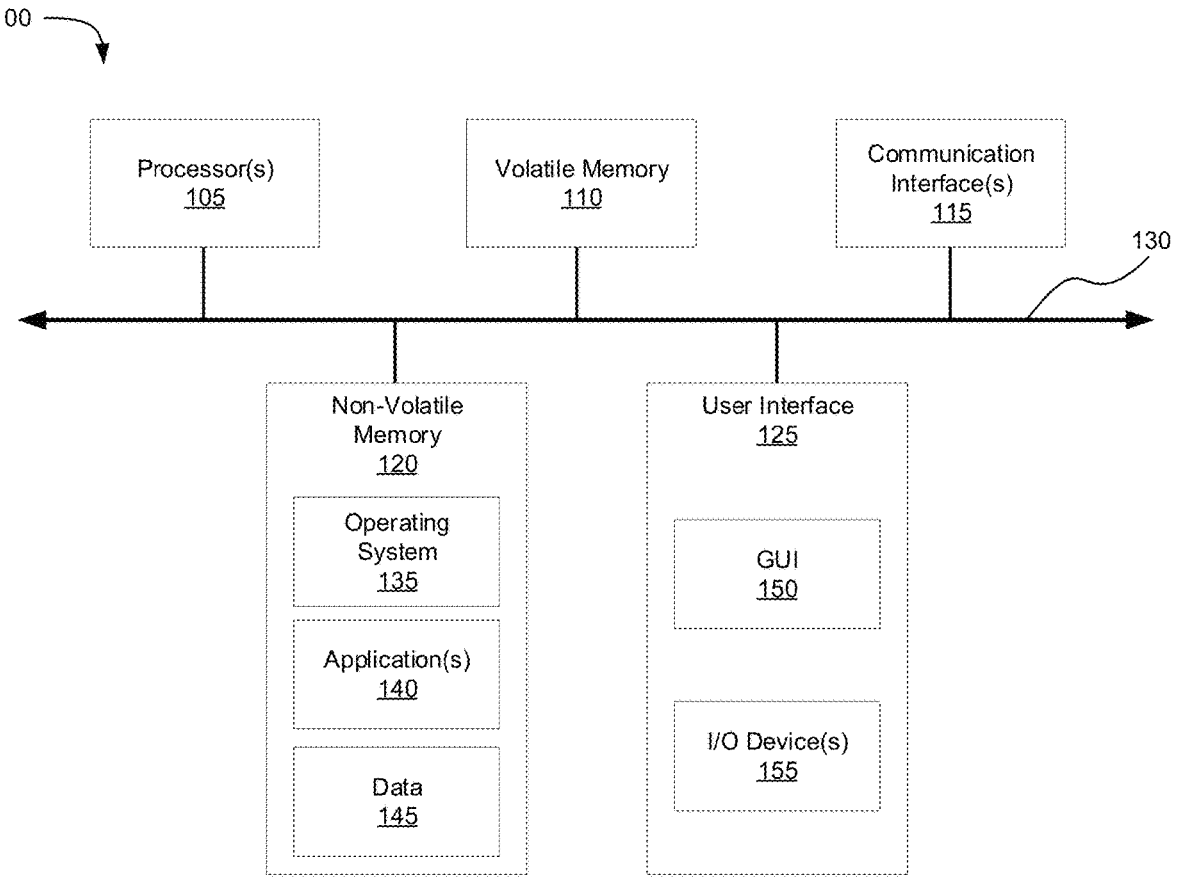
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, reference numbers generally indicate identical, functionally similar, and/or structurally similar elements.

DETAILED DESCRIPTION

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Section A describes a computing environment that may be useful for practicing embodiments described herein;

Section B describes the training and executing AI models for the AI-backed performance prediction system; and Section C describes a non-limiting example of a software solution using the methods and systems described herein.

Section A: Computing Environment:

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid-state drives (SSDs) such as a flash drive or other solid-state storage media, one or more hybrid magnetic and solid-state drives, and/or one or more virtual storage volumes, such as cloud storage, or a combination of such physical storage volumes and virtual storage volumes or arrays thereof), user interface (UI) 125, one or more communications interfaces 115, and communication bus 130. User interface 125 may include a graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). The non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than the main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary, and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hardcoded into the circuitry or soft coded by way of instructions held in a memory device and executed by the circuitry.

A "processor" may perform the function, operation, or sequence of operations using digital values and/or using analog signals. In some embodiments, the "processor" can be embodied in one or more application-specific integrated circuits (ASICs), microprocessors, digital signal processors (DSPs), graphics processing units (GPUs), microcontrollers, field-programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions, or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
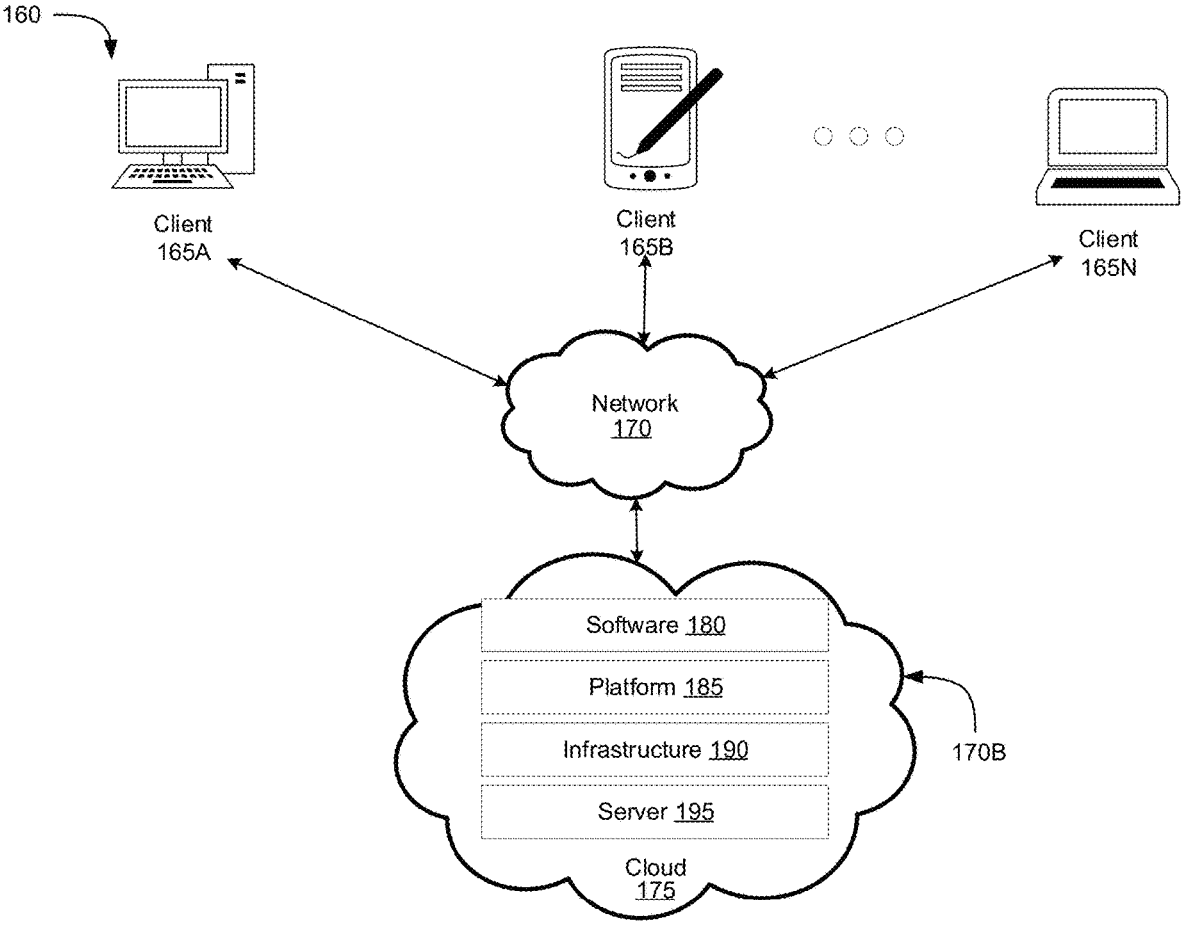
FIG. 1B is a block diagram depicting a computing environment comprising client devices in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred to as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms, or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms, or data centers. For example, the cloud 175 can include or correspond to a server or system remote from one or more clients 165 to provide third-party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of the software, an application, or a software application to serve multiple users. In some embodiments, the computing environment 160 can provide on-demand self-service to unilaterally provision computing capabilities (e.g., server time, network storage) across a network for multiple clients 165. The computing environment 160 can provide elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud-based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as e.g., Advanced Encryption Standard (AES). Data resources may be sent over Transport Layer Security (TLS) or Secure Sockets Layer (SSL).

Figure 2:
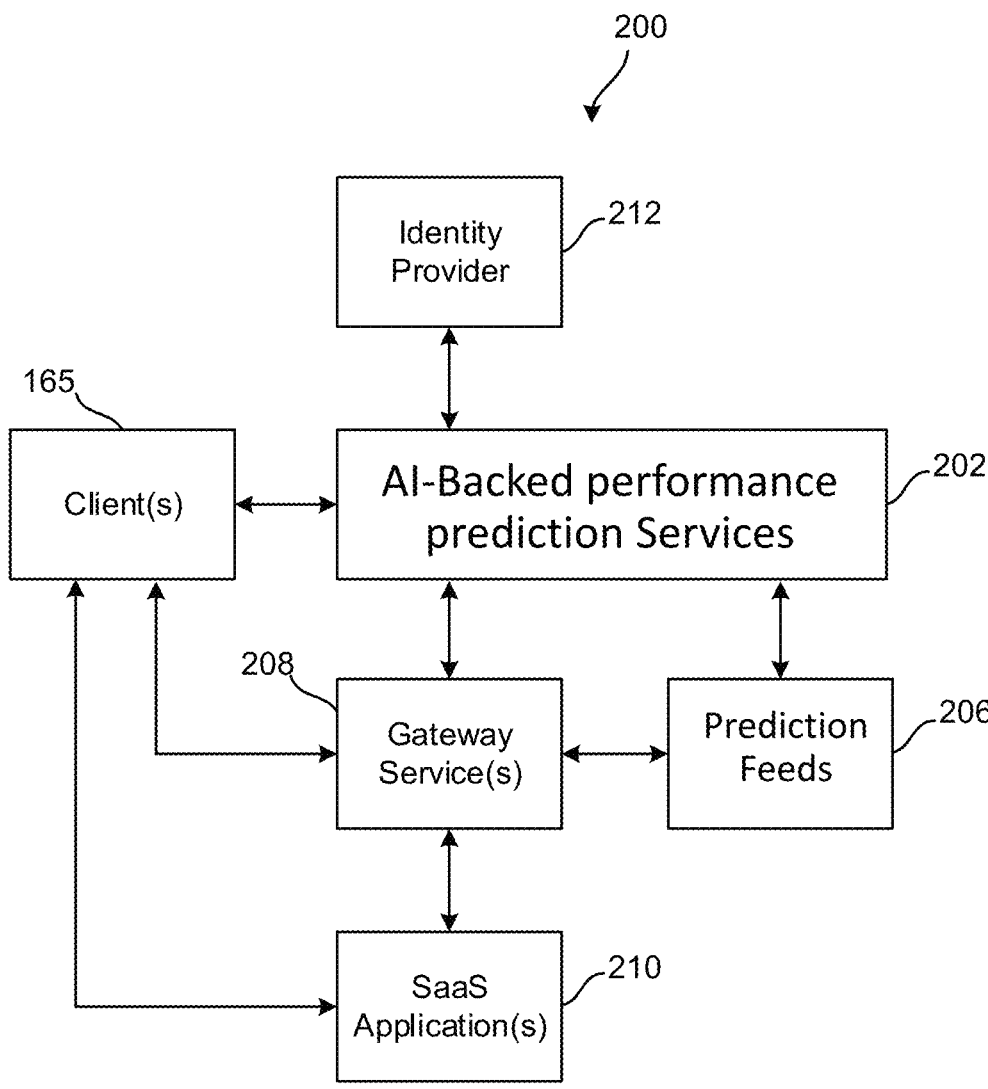
FIG. 2 is a block diagram of an example system in which performance prediction management services may manage and streamline access by clients to resource feeds (via one or more gateway services) and/or software-as-a-service (SaaS) applications.

FIG. 2 is a block diagram of an example system 200 in which an AI-backed performance prediction services server 202 may manage and streamline access by one or more clients 165 to one or more prediction feeds 206 (via one or more gateway services 208) and/or one or more software-as-a-service (SaaS) applications 210. As used herein, a prediction feed is a result of the execution of one or more AI models discussed herein. In particular, the AI-backed performance prediction services server 202 may employ an identity provider 212 to authenticate the identity of a user of a client 165 and, following authentication, identify one or more prediction feeds the user is authorized to access. For the prediction feed(s) 206, the client 165 may input attributes associated with a product and may request access to one or more AI models via a gateway service 208. For the SaaS application(s) 210, the client 165 may access the selected application directly. The SaaS application(s) 210 may allow the client 165 to access the platform discussed herein and view the prediction feeds 206.

The client(s) 165 may be any type of computing device capable of accessing the prediction feed(s) 206 and/or the SaaS application(s) 210, and may, for example, include a variety of desktop or laptop computers, smartphones, tablets, etc. Each of the AI-backed performance prediction services server 202, the prediction feed(s) 206, the gateway service(s) 208, the SaaS application(s) 210, and the identity provider 212 may be located within an on-premises data center of an organization for which the system 200 is deployed, within one or more cloud computing environments, or elsewhere.

Section B: Training and Executing the AI-Backed Performance Prediction System

Figure 3:
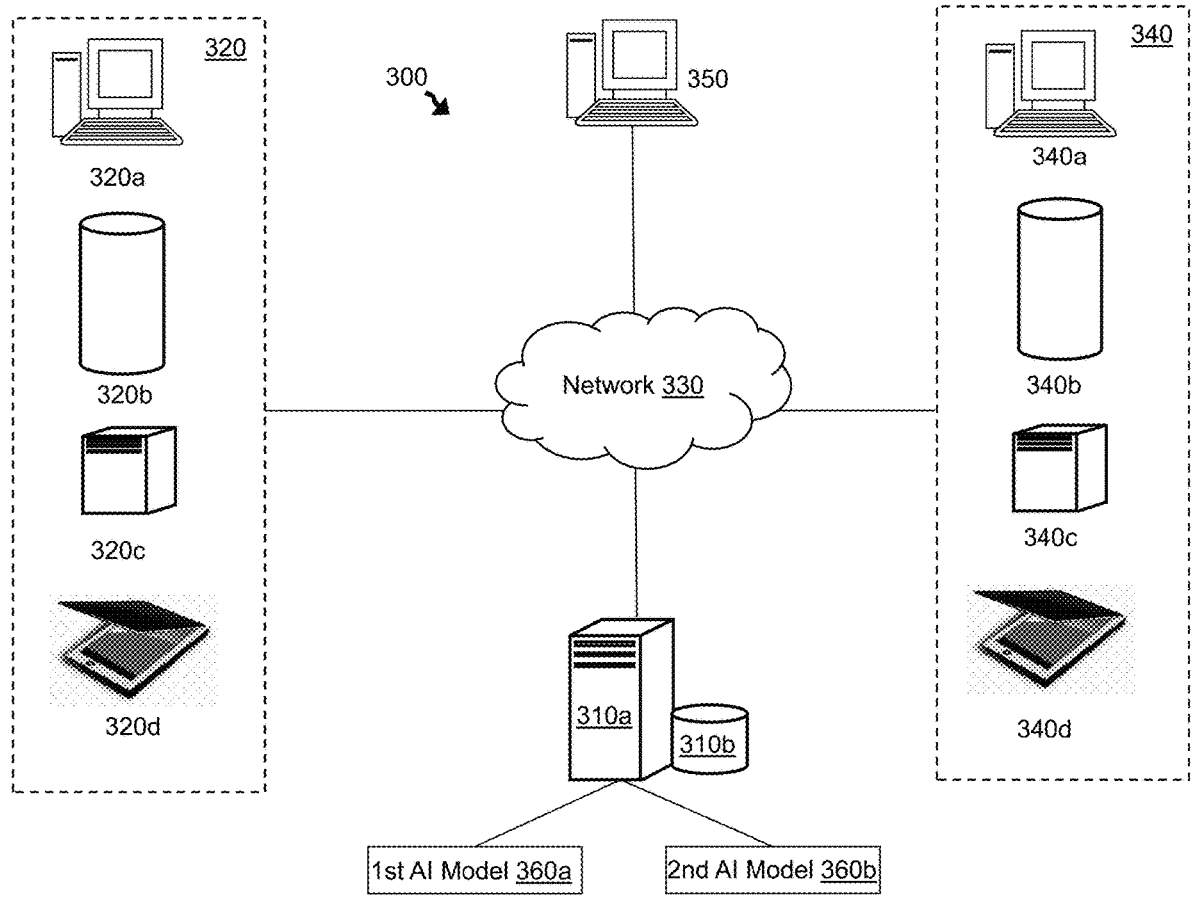
FIG. 3 is an example computing environment for the AI-backed performance prediction system, in accordance with one or more implementations.

As will be described throughout, a server of an AI-backed performance prediction system 300 (such as an analytics server 310a) can retrieve and analyze data using various methods described herein to predict the performance of a proposed product. FIG. 3 is a non-limiting example of components of the AI-backed performance prediction system 300 in which the analytics server 310a operates. The analytics server may be any computer, server, or processor described in FIGS. 1A-2.

The analytics server 310a may utilize features described in FIG. 3 to retrieve data and to generate/display results. The analytics server 310a is communicatively coupled to a system database 310b, electronic data sources 320a-d (collectively electronic data sources 320), end-user devices 340a-d (collectively end-user device 340), and an administrator computing device 350. The system 300 is not confined to the components described herein and may include additional or alternative components, not shown for brevity, which is to be considered within the scope of the embodiments described herein.

The above-mentioned components may be connected through a network 330. The examples of the network 330 may include but are not limited to, private or public LAN, WLAN, MAN, WAN, and the Internet. The network 330 may include both wired and wireless communications according to one or more standards and/or via one or more transport mediums.

The analytics server 310a may utilize one or more application programming interfaces (APIs) to communicate with one or more of the electronic devices described herein. For instance, the analytics server may utilize APIs to automatically receive data from the electronic data sources 320. The analytics server 310a can receive data as it is generated, monitored, and/or processed by the electronic data source 320. For instance, the analytics server 110a may utilize an API to receive market performance data from the database 320b (e.g., third party rating or marketing agency) without any human intervention. This automatic communication allows for faster retrieval and processing of data.

The analytics server 310a may generate and/or host an electronic platform having a series of graphical user interfaces (GUIs) configured to use various computer models (including artificial intelligence (AI) models) to project and display market performance metrics. The platform can be displayed on the electronic data sources 320, the administrator computing device 350, and/or end-user devices 340. An example of the platform generated and/or hosted by the analytics server 310a may be a web-based application or a website configured to be displayed on different electronic devices, such as mobile devices, tablets, personal computers, and the like. Even though certain embodiments discuss the analytics server 310a displaying the results, it is expressly understood that the analytics server 310a may either directly generate and display the platform described herein or may present the data to be presented on a GUI displayed on the end-user devices 340.

The analytics server 310a may host a website (also referred to herein as the platform) accessible to end-users operating any of the electronic devices described herein (e.g., end-users), where the content presented via the various webpages may be controlled based upon each particular user's role or viewing permissions. The analytics server 310a may be any computing device comprising a processor and non-transitory machine-readable storage capable of executing the various tasks and processes described herein. Non-limiting examples of such computing devices may include servers, computers, workstation computers, personal computers, and the like. While this example of the system 300 includes a single analytics server 310a, in some configurations, the analytics server 310a may include any number of computing devices operating in a distributed computing environment.

The analytics server 310a may execute one or more software applications configured to display the platform (e.g., host a website), which may generate and serve various webpages to each electronic data sources 320 and/or end-user devices 340. Different end-users may use the website to view and/or interact with the predicted results.

The analytics server 310a may be configured to require user authentication based upon a set of user authorization credentials (e.g., username, password, biometrics, cryptographic certificate, and the like). In such implementations, the analytics server 310a may access the system database 310b configured to store user credentials, which the analytics server 310a may be configured to reference to determine whether a set of entered credentials (purportedly authenticating the user) match an appropriate set of credentials that identify and authenticate the user.

The analytics server 310a may also store data associated with each user operating one or more electronic data sources 320 and/or end-user devices 340. The analytics server 310a may use the data to determine whether a user device is authorized to view results generated by the AI models.

The analytics server 310a may receive product data, market data, or any other pertinent data from one or more of the electronic data sources 320. The electronic data sources 320 may represent different databases or third-party vendors who possess historical product data, marketing data, performance data, and the like. For instance, the electronic data sources 320 may represent computers, databases, and servers of a grocery store (or chain of grocery stores) that can provide scanner data associated with a particular product (e.g., sales data). In another example, the electronic data sources 320 may represent a marketing firm providing information regarding how a particular product was marketed (e.g., how much money was spent on marketing the product). In another example, the electronic data sources 320 may represent a rating agency providing consumer sentiment data regarding a particular product. The analytics server 310a may use the data collected from the electronic data sources 320 to train the AI models 360a and 360b. Specifically, the analytics server 310a may retrieve data from the electronic data sources 320 and process the collected data, thereby generating a training dataset. The analytics server may then train the AI models 360a-b using the training dataset. The analytics server 310a then displays the results via the platform (e.g., GUIs described herein) on the administrator computing device 350 or the end-user devices 340.

The end-user devices 340 may be any computing device comprising a processor and a non-transitory machine-readable storage medium capable of performing the various tasks and processes described herein. Non-limiting examples of an end-user device may include workstation computers, laptop computers, tablet computers, and server computers. In operation, various end-users may use end-user devices 340 to access the platform operationally managed by the analytics server 310a to enter product information and view predicted/projected results.

The administrator computing device 350 may represent a computing device operated by a system administrator. The administrator computing device 350 may be configured to display retrieved data, in the form of results generated by the analytics server 110a, where the system administrator can monitor various models utilized by the analytics server 110a, review feedback, and modify various thresholds/rules described herein. In a non-limiting example, the system administrator may monitor the training of the AI models and/or generation of the training datasets.

The analytics server 310a may access, train, and execute a plurality of AI models. Although the example system 300 depicts the AI models stored on the analytics server 310a, the AI models may be stored on another device or server (e.g., store locally or in cloud storage). The analytics server 310a may execute the AI models 360a-b in tandem to predict performance metrics for a product.

The first AI model 360a may have been previously trained by the analytics server 110a using historical data collected from the electronic data sources 320. The first AI model 360a may predict distribution data associated with a product, such as a distribution value indicating a projected amount distribution associated with the product being analyzed. The predicted distribution value may then be ingested by the second AI model 360b to predict other performance data, as described in FIG. 4B.

Figure 4A:
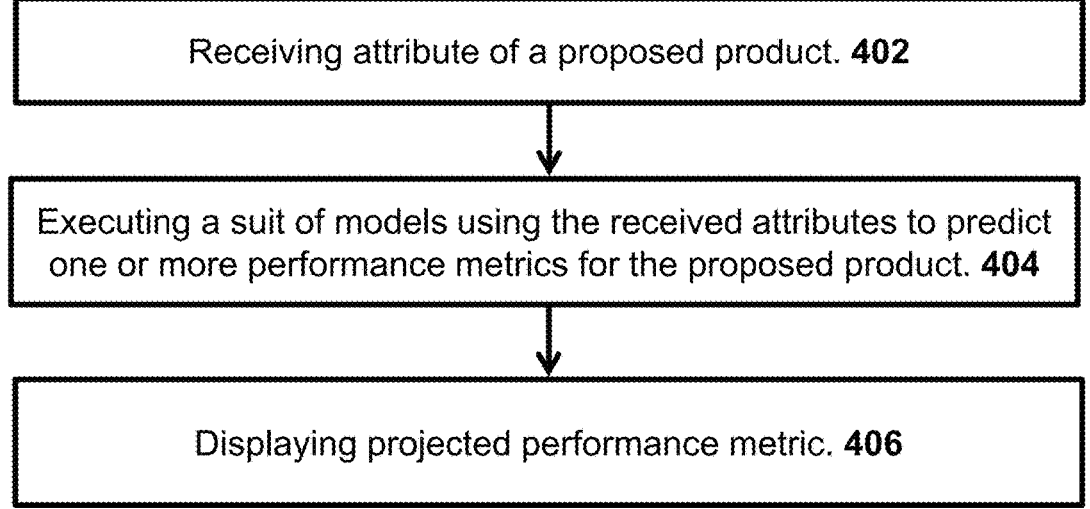
FIG. 4A is an example workflow executed by the AI-backed performance prediction system, in accordance with one or more implementations.

Referring now to FIG. 4A, a workflow diagram for an AI-backed performance prediction system is depicted, in accordance with one or more implementations. The method 400 includes steps 402-406. However, other embodiments may include additional or alternative execution steps or may omit one or more steps altogether. In addition, the method 400 is described as being executed by a system, similar to the AI-backed performance prediction system described in FIG. 3. Different steps of the method 400 or different parts of the different steps may be executed by any number of computing devices operating in the distributed computing system described in FIGS. 1A-3.

Furthermore, even though some aspects of the method 400 are described in the context of predicting the performance of a food product, the methods and systems described herein apply to analyzing any product or product concept and are not limited to food products.

At step 402, the system may receive one or more product attributes from a user computing device accessing an electronic platform provided by the system. A user may access an electronic platform provided by the system to input information regarding a new product or a concept. As described herein, the analytics server may generate an electronic platform having various graphical user interfaces (GUIs) to provide predictive services to a variety of clients. In an embodiment, the electronic platform may be a website hosted by the system, which is available to different clients. The purpose of the said website may be to collect design information (e.g., product attributes or concept attributes), provide a platform to securely upload product data (e.g., images or other machine-readable data, such as an image of the product packaging), and review predictions regarding the product's performance. Therefore, the electronic platform may act as an intermediary series of GUIs between the client and the AI model(s) discussed herein.

The user may access the platform and use various input elements provided by the platform to input design/product attributes for a proposed new product. For instance, in the example that the proposed product is a new packaged frozen burrito, the user may provide ingredients and packaging information associated with the frozen burrito.

At step 404, the system may execute one or more AI models using the received attributes (step 402) to predict one or more performance metrics for the proposed product. The one or more AI models may be previously trained using historical data (e.g., other products and how they have performed in the market), such that the AI models can predict how the proposed product would perform in the future.

The system may retrieve and aggregate the historical data and may generate appropriate training datasets that include aggregated historical data. The system may also process the historical data (e.g., perform data clean up and processing), such that the historical data is in a format that is compatible and appropriate to be ingested by the AI models for training, testing, and validation purposes. Once the AI models are trained, the AI models are ready to be deployed and executed using new information (e.g., attributes received in step 402) and ready to predict new values.

As a first step of training the AI models, the system may generate a training dataset. The training dataset may include data received from various data repositories. The data included within the training dataset may include any data needed to train the AI model(s), such that the AI model(s) can predict or project performance metrics associated with a new proposed product. In other words, the training dataset may include historical "real world" products, their information, and corresponding consumer data. For each product, the system may aggregate item-level data (also referred to as scanner data), such as sales, distribution value, price, and promotional price data associated with the product. The system may also include UPC level data, such as words that appear on the label, ingredients, nutrients facts, claims on the package (e.g., gluten-free, diet, sugar, and low carb), packaging type, and artwork associated with the product. The training dataset may also include the corresponding brand's media spend data received for the product (e.g., how much was spent advertising for the product). The above-described information may be collected from different data repositories, such as third-party rating companies (e.g., Neilsen) or different retailers offering the product (e.g., aggregating data collected from point of sale systems).

Optionally, the training dataset may include consumer-specific data, such as brand perception and product feedback data. The system may execute a scraping protocol and analyze consumer data (e.g., consumer reviews) to identify and understand the sentiment and impact of specific drivers. For instance, consumers may characterize a product as "chewy" or "too spicy." As a result, the system may determine that certain ingredients have negatively affected the corresponding product.

Referring now to FIG. 4C, the system may analyze different websites to identify the unmet needs of consumers. For instance, by analyzing consumer data (e.g., how consumers have reacted towards a product), the system may determine consumer sentiment and trends. As depicted, the system may analyze consumers' unmet needs and determine that "low sugar" combined with "dairy-free" has significant potential across the target occasion and should be the focus of future innovation. The system may also determine that "low sugar" also pairs well with "high protein" when claimed. The system may include this data within the training dataset.

The training dataset may also include packaging data associated with different products and their corresponding performance. For instance, as depicted in FIG. 4D, the system may analyze different products and packages. For instance, packaging 418, 420, and 422 correspond to chicken soup cans packaged differently. The system may analyze logo data (e.g., size, what portion of the whole package consists of the logo), placement of the logo, colors, and the like. The system may also determine whether an image of the product (i.e., chicken soup) is present on the packaging, whether the image has colors, and/or whether the image includes a person, place, or an item. The system may also analyze and determine whether the package includes the flavor data (e.g., how big the flavor is presented on the package in terms of percentage or font size, where the flavor data is presented on the package, color/font of the flavor data, and the like). The training dataset may also include market performance for the soup using different packages depicted in FIG. 4D, such that the AI models can determine if/how the packaging affects product performance.

As a second step of training the AI models, the system may process the data within the training dataset (e.g., data clean-up stage). In some configurations, the system may execute various data preparation protocols to transform the received data into machine-readable data that could be analyzed and ultimately used to train the AI model(s) discussed herein. The system may create uniform distributions and transform values, such that the data is efficiently ingested by the AI models.

In an example, the system may process the language extracted from the labels (e.g., ingredients printed on a label) to identify and extract the actual ingredients used in the product. For instance, "chicken" as an ingredient can be labeled as chicken breast, chicken thighs, roasted chicken as ingredients. Therefore, just adding chicken to the list of ingredients may not accurately reflect the type of chicken used within the product. Moreover, onion as an ingredient may be labeled in multiple different ways. For instance, powered dry onion may have a different impact than raw onion or grilled onions. Therefore, the system may use natural language processing to identify each type of ingredient and accurately account for the subtle differences that could ultimately impact sales and consumer sentiment. In some configurations, the system may use existing recipes from third-party data sources (e.g., YUMMLY recipes applied to cuisine data) to determine ingredients associated with the cuisine.

In another example, the system may process the data to attribute sales to a particular brand. For instance, Brand A may include many sub-brands (e.g., Brand A may market different items under different names). The system may use targeted coding to estimate a numerical value for each sub-brand. For instance, if Brand A has a total sale volume of $10 million, the system may determine a portion of that volume that should be attributed to each sub-brand of Brand A for a particular product.

In another example, the system may use various existing or pre-generated ontologies and normalize the extracted terms. Using the normalization protocol allows for more efficient identification and clustering of data records that correspond to at least one similar attribute.

In another example, the system may use statistical protocols to de-noise data within the training dataset. For instance, the system may de-noise distribution data to account for seasonal changes (e.g., distribution value may be affected by the time of year the product is offered). The distribution data received by the system may be in form of periodic data (e.g., weekly sales or weekly distribution). Instead of aggregating all the periodic data received, the system may smooth the data and identify a yearly distribution. The yearly distribution data (distribution values) may provide a smoother curve that does not have as many peaks and lows. As a result, ingesting this data may be more beneficial for the AI models.

In another example, the system may curtail certain portions of the data within the training dataset to reduce training bias. The system may identify outlier data (e.g., products that represent outlier data) and remove the corresponding data from the training dataset. For instance, the system may identify and remove "high-velocity products" (e.g., outlier high-performing products or products that are seasonal).

As a third step, when the training dataset is processed, the system may train the AI models. After the data is cleaned (e.g., terms are extracted and normalized and outliers are removed from the training dataset), the system may use the training dataset to train one or more models discussed herein. The AI models may comprise a neural network that is iteratively trained by the system using the training dataset. In an alternative embodiment, the system may use a gradient boosting method to train the AI models. However, it is expressly understood that the AI models are not limited to either method.

The system may train the AI models using three different datasets. A first dataset may include scanner data for retail distribution values and sales volume of each UPC. The second dataset may include label data describing the ingredients and claims on each UPC. The third dataset may include media spend data describing the investments made by brands In promoting their products. The dataset may be specific to different regions. For instance, the dataset may be specific to the United States (or a different country) or a region within the United States (e.g., California). In this way, the model may be trained using a dataset that is specific to the segmented region and can predict results for that region.

The AI models may include neural networks that include multiple layers. In various embodiments, the AI models may use one or more deep learning engines to train themselves. Although exemplified using deep neural networks, it should be understood that any alternative and/or additional deep learning model(s) might be used to implement deep learning engines. The deep learning engines include processing pathways that are trained during the training phase. A multi-layer neural network may consist of a stack of layers each performing a specific operation, e.g., pooling, loss calculation, etc. Each intermediate layer receives the output of the previous layer as its input. The beginning layer may be an input layer, which is directly connected to an input received from the training dataset. The next set of layers may be convolutional layers that present the results of convolving a certain number of filters with the input data and perform as a feature extractor. The output of each layer may be considered as an activation map, which highlights the effect of applying a specific analytical protocol on the input.

The AI models may be trained based on previous products, their attributes, and their corresponding performance within the market. For instance, the system may train the AI models using previously successful and unsuccessful products (e.g., products that had high sales volumes and products that did not have high sales volumes). The system may train the AI models using a supervised method where the data records within the training dataset are labeled. For instance, the training dataset may be labeled, such that the AI models can identify and distinguish which product corresponds to which sales volume and whether that product included an ingredient that was received positively by consumers. The AI models can also connect the labeled product data to their corresponding attributes. Using various AI training techniques, the AI models may identify hidden patterns within the data records of the training dataset, such that the AI models can identify new performance metrics given a new set of attributes for a new product.

Additionally or alternatively, the analytics server may use an unsupervised method where the training dataset is not labeled. Because labeling the data within the training dataset may be time-consuming and may require vast computing power, the system may utilize unsupervised training techniques to train the AI models. The system may not be limited to the above-described machine learning and training techniques. For instance, the system may use both techniques, wherein the system may label data when applicable and use a supervised training method (e.g., certain portions of the data are labeled as ground truth). If the system cannot verify the accuracy of portions of the data retrieved, the system may use an unsupervised training method. Therefore, the system may use a semi-supervised method to train the AI models. The analytics server may also utilize reinforcement learning to train the second AI model.

In some configurations, the system may also use a gradient boosting method to train the AI models. The gradient boosting method is a machine learning technique for regression, classification, and other tasks, which produces a prediction model in the form of an ensemble of decision trees.

During training, the system may iteratively produce new predicted results (recommendations) based on the training dataset (e.g., for each product within the training dataset for which the performance metrics are known). If the predicted results do not match the performance metrics (e.g., real outcome), the system continues the training unless and until the computer-generated prediction satisfies one or more accuracy thresholds and is within acceptable ranges. For instance, the analytics server may segment the training dataset into three groups (i.e., training, validation, and test). The system may train the AI models based on the first group (training). The analytics server may then execute the (at least partially) trained AI models to predict results for the second group of data (validation). The analytics server then verifies whether the prediction is correct. Using the above-described method, the analytics server may evaluate whether the AI models are properly trained. The analytics server may continuously train and improve the models using this method. The analytics server may then gauge the AI models' accuracy (e.g., area under the curve, precision, recall, root mean squared metric, or mean absolute error metrics) using the remaining data points within the training dataset (test). When the AI models' accuracy is above a certain defined threshold, the AI models are ready to be deployed.

In some configurations, the system may use a randomized split to segment the data into test and validation data. However, a randomized split may generate further bias in data segmentation. For instance, frozen pizza for a particular brand may have a sales volume of $15 million. However, similar frozen pizza for a different brand may have a sales volume of $2 million. Therefore, training the model via data associated with the former brand and testing the results against the latter brand may generate unreliable or undesirable results. When the system determines that a randomized split produces (or would produce) unreliable results, the system may split the data based on filtering attributes to create a balance between test and evaluation data.

During training, in particular, when using the boosting tree method, the system may select a portion of the historical product attributes to be ingested by the AI models. Because the aggregated products and their corresponding performance data may be too large, the system may filter certain data based on various filtering protocols. In one example, the training dataset may include 50,000 different products and the corresponding historical performance data. As a result, the list of ingredients included within the training dataset may be too voluminous to allow for timely or efficient training. To rectify this inefficiency, the system may first determine which of these ingredients should be considered in the final version of the AI model. The system may achieve this via analyzing the ingredients and executing different statistical approaches to identify correlations of different ingredients to the sales across different categories. The system may then generate a subset of the ingredients for training the AI models where the ingredients within the subset of ingredients have a higher importance/impact value on the overall results.

Figure 4B:
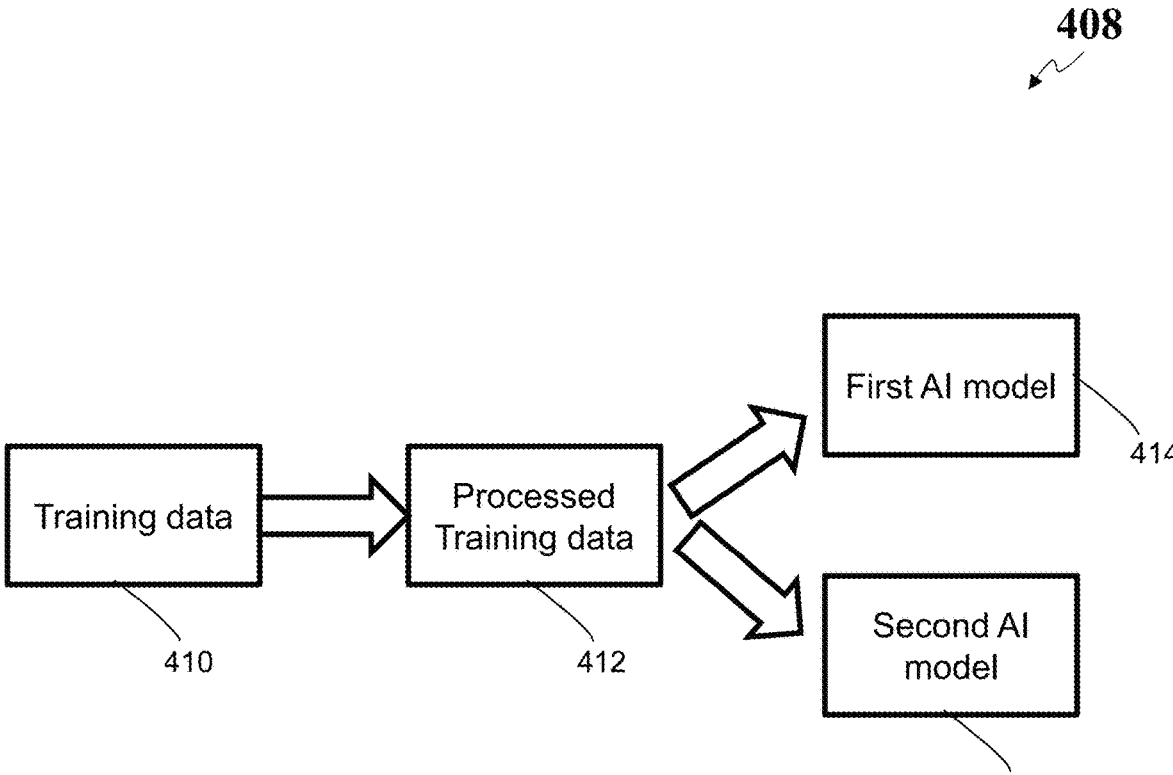
FIG. 4B is an example workflow diagram for training one or more AI models for the AI-backed performance prediction system, in accordance with one or more implementations.
Figure 4D:
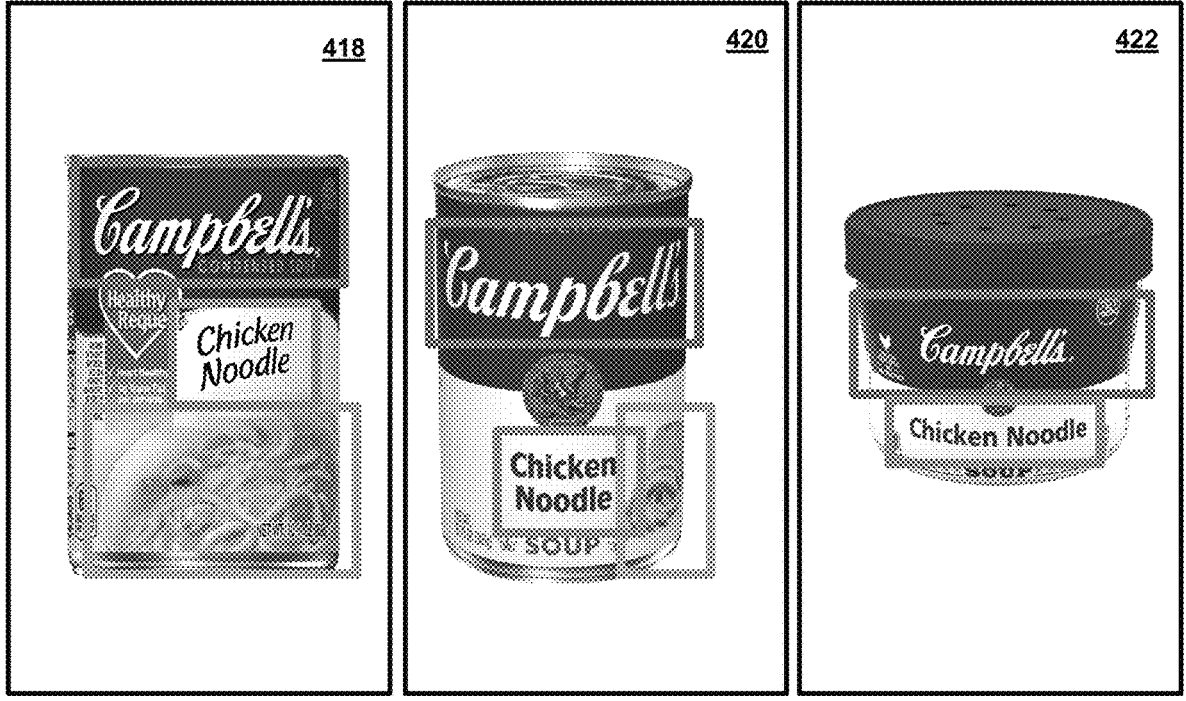

Referring now to FIG. 4B, a schematic diagram for training the AI models discussed herein is presented, in accordance with an embodiment. The training process 408 starts with retrieving the training data 410. The system may query and retrieve various historical product data and their corresponding performance metrics from a variety of sources to generate the training data 410. The system may then pre-process the data using various methods discussed herein (412). When the data is preprocessed, the system may train two different AI models.

The system may train the first AI model 414 to predict an estimated total distribution points (TDP or otherwise referred to herein as distribution value) that the new proposed product is expected to have as a function of label data. TDP or distribution value refers to a measurement that informs the user regarding the relative performance health of the proposed product by calculating the number of retailers that would agree to carry the proposed product (breadth). Therefore, the distribution clave represents a degree to which a product will be carried by retailers, typically depicted as a percentage of total capacity (e.g., shelves, stores, and the like that carry the product). In other words, the first AI model may 414 predict how well the proposed product will be distributed. Specifically, the first AI model 414 may analyze the product attributes received from the user and predict a TDP for the proposed product.

The system may train the second AI model 416 to use the estimated TDP predicted by the first AI model 414 to predict sales for the proposed product. To achieve this, the second AI model 416 may include three sub-models or three layers where each sub-model is configured to predict or project a sub-sales value. The system may then combine (using various methods, such as simple addition or weighted addition) the projected sub-sales values to project a sales value that is presented to the end user. Accordingly, the first sub-model may be trained to predict sales volume as a function of label data excluding the specification (i.e., derived feature data) or a first projected/predicted sub-sales value. The second sub-model may be trained to predict/project sales as a function of label data excluding the ingredients (also referred to herein as the second projected sub-sales value). The third sub-model may be trained to analyze the outputs from the first two sub-models (e.g., using a lasso regression protocol) to predict a unified sales volume for the proposed product. For instance, the third sub-model may add the first projected sub-sales value (predicted by the first sub-model) and the second projected sub-sales value (predicted by the second sub-model).

The system may use the depicted scheme having the described models and sub-models to produce more efficient and more accurate predictions. However, it is expressly understood that a different number of models and sub-models may be utilized to predict performance metrics for different proposed products. For instance, the suite of AI models may include more or fewer AI models and the second AI model may include fewer or more sub-models.

The system may generate the depicted schema having multiple models because sales volume prediction is typically heavily influenced by distribution. In some configurations, distribution may be the most important indicator of how well a proposed product will perform. Therefore, it would unduly burden the client to expect the client to estimate or predict a distribution of a proposed product. Additionally, training one more model to predict the distribution and all other performance metrics may not be efficient. Therefore, the suite of AI models depicted in FIG. 4A allows segmenting the prediction into distinct tasks where the prediction of one model is used by another model to ultimately generate one result.

Section C: A Non-Limiting Example of a Software Solution Using the Methods and Systems Described Herein:

In a non-limiting example, a user accesses the electronic platform provided by the system. The system may first authenticate the user using various authentication methods. When the system determines that the user is authorized to access the platform, the system displays the GUI 500 that includes various input elements configured to receive one or more attributes of a new product. Using the input elements, the user may input attributes of a concept associated with the new product to be analyzed by the system.

Specifically, the user may indicate a category of the new product (e.g., frozen dinner and entrées), a department or a division within a store that would carry the product (e.g. frozen food section), a specific category or subcategory associated with the product (e.g., frozen burritos). The user may use the input elements to also input the manufacturer, brand, storage requirements, and like. Furthermore, the user may use the input elements to input product attributes such as product weight, units per package, a proposed price, and the proposed amount of resources to be spent on media (e.g., advertising and other media activity), a discount price provided to certain providers, and a number of weeks associated with the discount price.

Using the input elements, the user may also input the ingredients of the proposed product. For instance, the user may interact with the input element 502 to input various ingredients associated with the proposed product using a drop-down menu as depicted in the GUI 504. When the user clicks on the input element 502, the system may display the drop-down menu 506 that includes various options for the user's selection. The ingredients included within the drop-down menu 506 may be derived from previous products and their corresponding labels.

This system may also display the GUI 508 and allow the user to input various marketing claims including various allergens, flavors, nutritional content, and other specialties. Using these input elements, the user may be able to identify whether the product is Keto-friendly, gluten-free, or low fat. These claims would be included within the proposed product packaging, such that it would persuade certain potential buyers based on the claims.

The system may provide a drop-down menu of potential claims to be included within the proposed product packaging. For instance, when the user interacts with the input element 510, the system may display the GUI 512 that includes the drop-down menu 514. Similar to the drop-down menu of ingredients, the system may have previously analyzed different claims and may have generated a list of claims for the user's selection.

Using the inputted attributes, the system may generate a nutritional list associated with the proposed product (GUI 516). The user may review the nutritional values and may revise, delete, and/or add values accordingly. At any given time, the user may access any of the input elements described herein to change an attribute accordingly. For instance, if the user determines that a nutritional value is incorrect, the user may change one or more attributes associated with the proposed product using one of the input elements depicted and described herein. As a result, the system may re-generate the nutritional values. In some embodiments, one or more of the input elements depicted herein may be prefilled using data retrieved from one or more vendors or third-party servers.

Even though the input elements depicted in FIGS. 5A-5E are depicted as being filled in by the user, in some embodiments one or more of the input elements corresponding to attributes of the proposed products may have an unknown attribute. For instance, one input element may inquire the user regarding a potential price of the proposed product. If the user inputs a potential price, the system may calibrate and use the potential price to predict product performance. For instance, the user in the depicted embodiment has inputted $9.99 for the price of the product. As a result, the system may predict a performance based on the inputted price. However, if the user leaves the input element blank, the system may generate different scenarios for different price points. That is, the system may calculate or optimize a price for the product based on various other performance metrics (e.g., the system may determine an optimum price for the product).

When prompted by the user, the system may execute one or more AI models discussed herein to predict various performance metrics for the proposed product. As a result, the system may direct the user to the GUI 518 that displays the predicted results.

The GUI 518 includes a graphical element 526 indicating a predicted sales value for the first year using the attributes inputted by the user. The graphical element 528 may display a total distribution points value (TDP also referred to herein as the distribution value or distribution score) based on a predefined time interval. This indicator may be a measurement of how well a product is predicted to be selling.

The GUI 518 may also include different scenarios for different potential attributes of the proposed product. For instance, the graphical element 520 displays predicted sales based on different price points. Specifically, line 520a displays a predicted weekly TDP based on potential sales at $9.99. Similarly, the line 520b illustrates the same values at a price point of $12.99 and line 520c predicts the same values at the price point of $6.99.

Figure 5A:
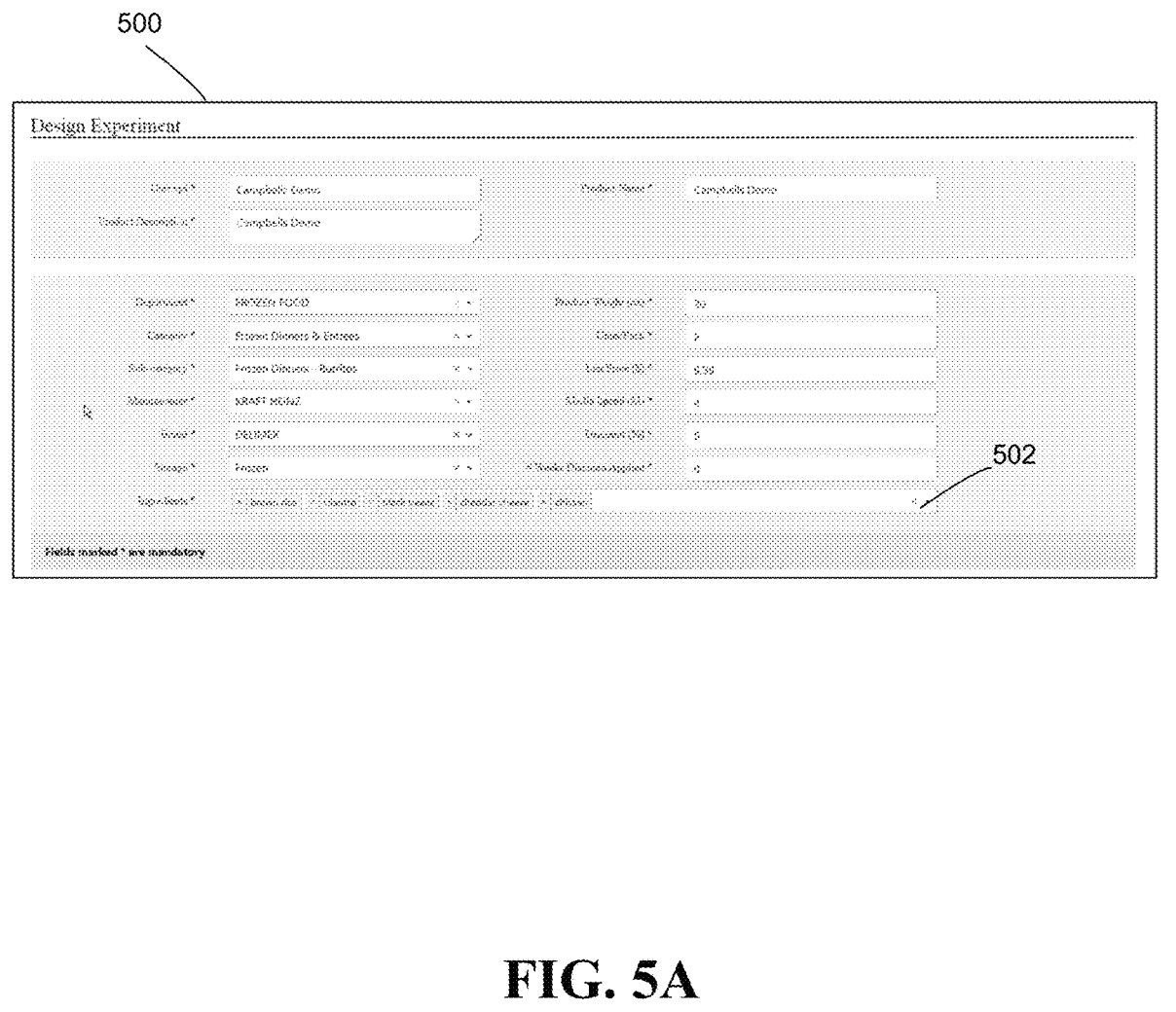
Figure 5B:
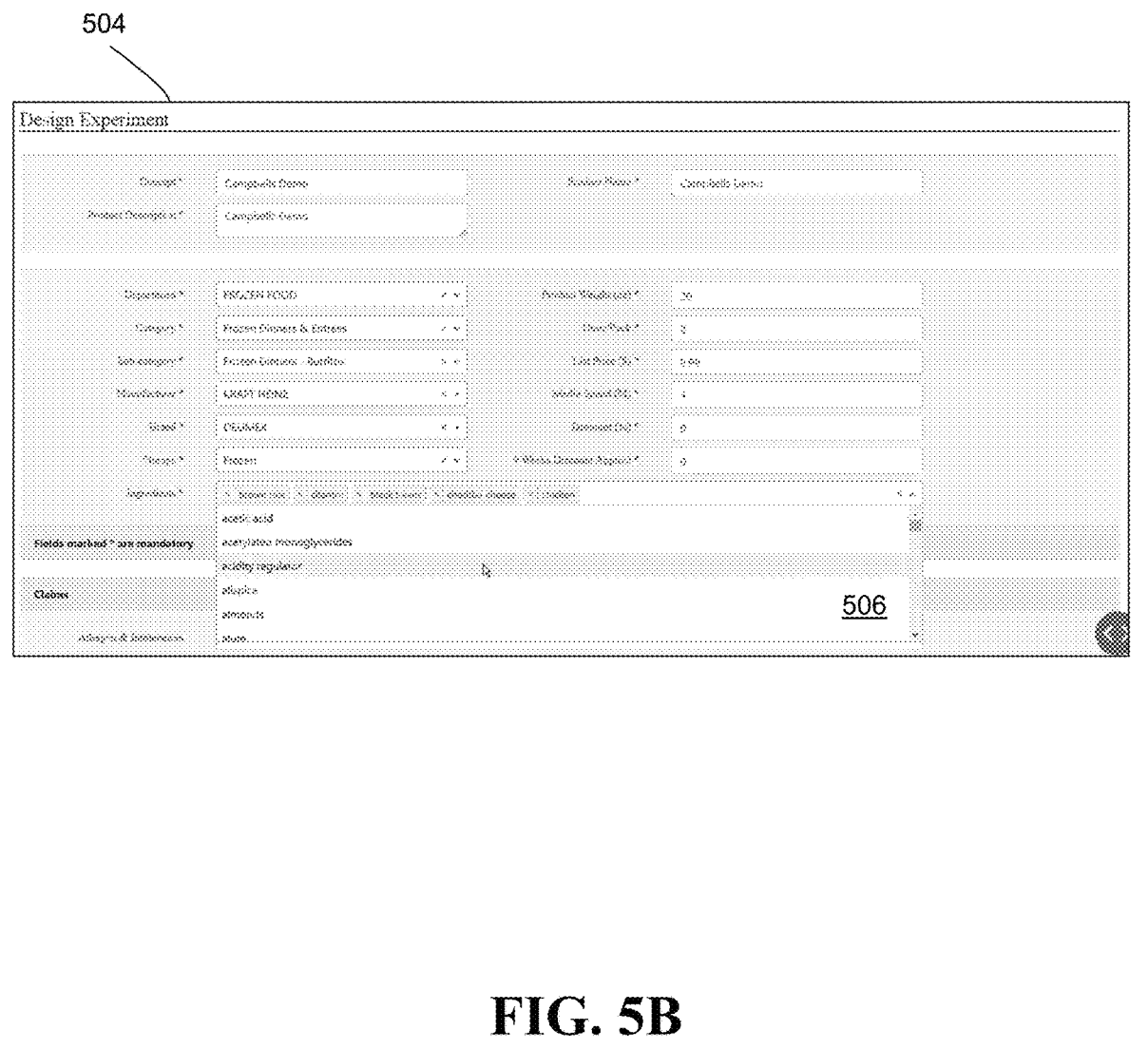
Figure 5C:
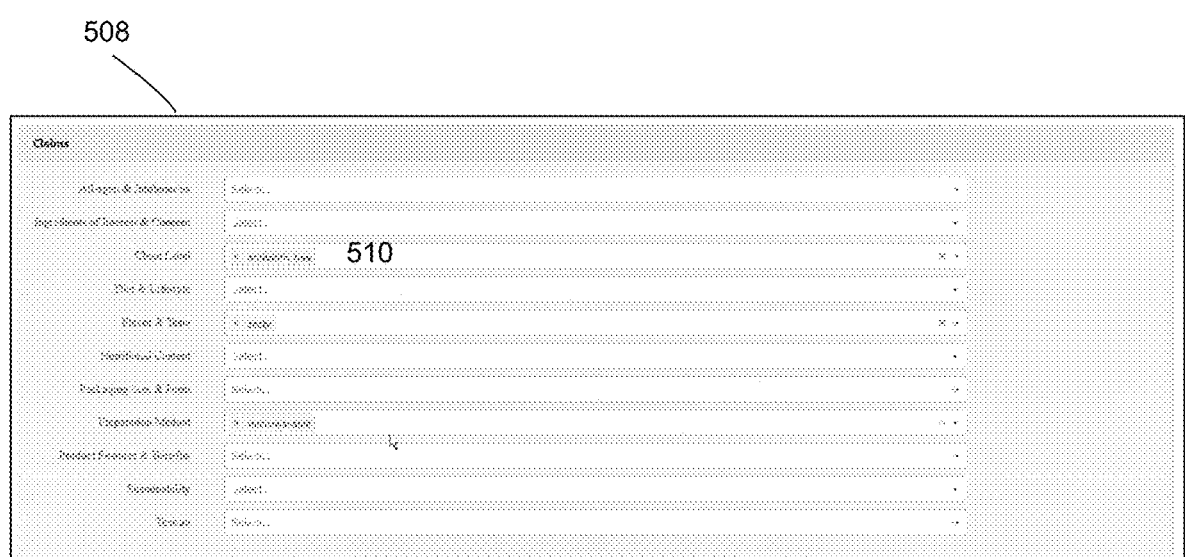
Figure 5D:
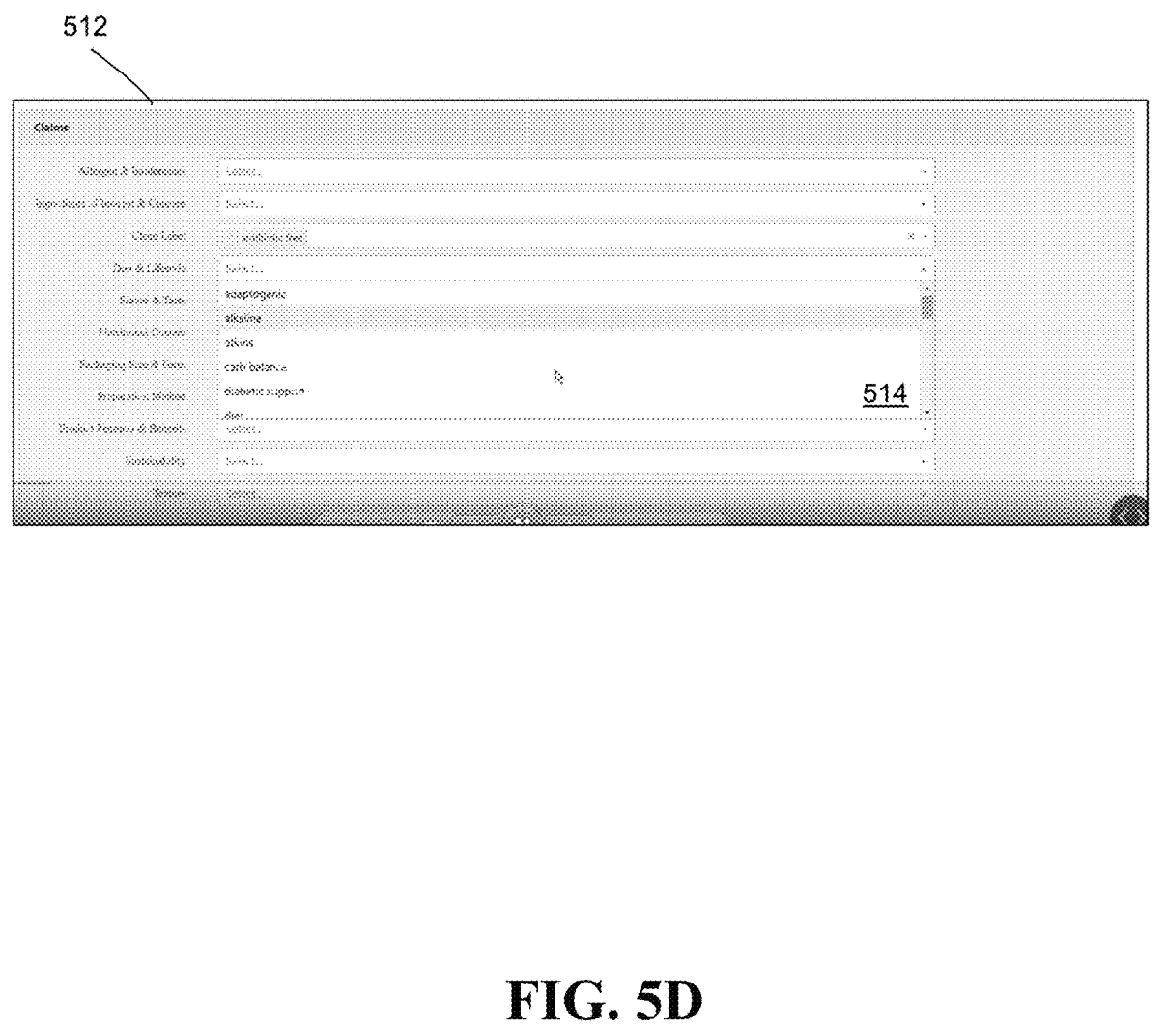
Figure 5F:
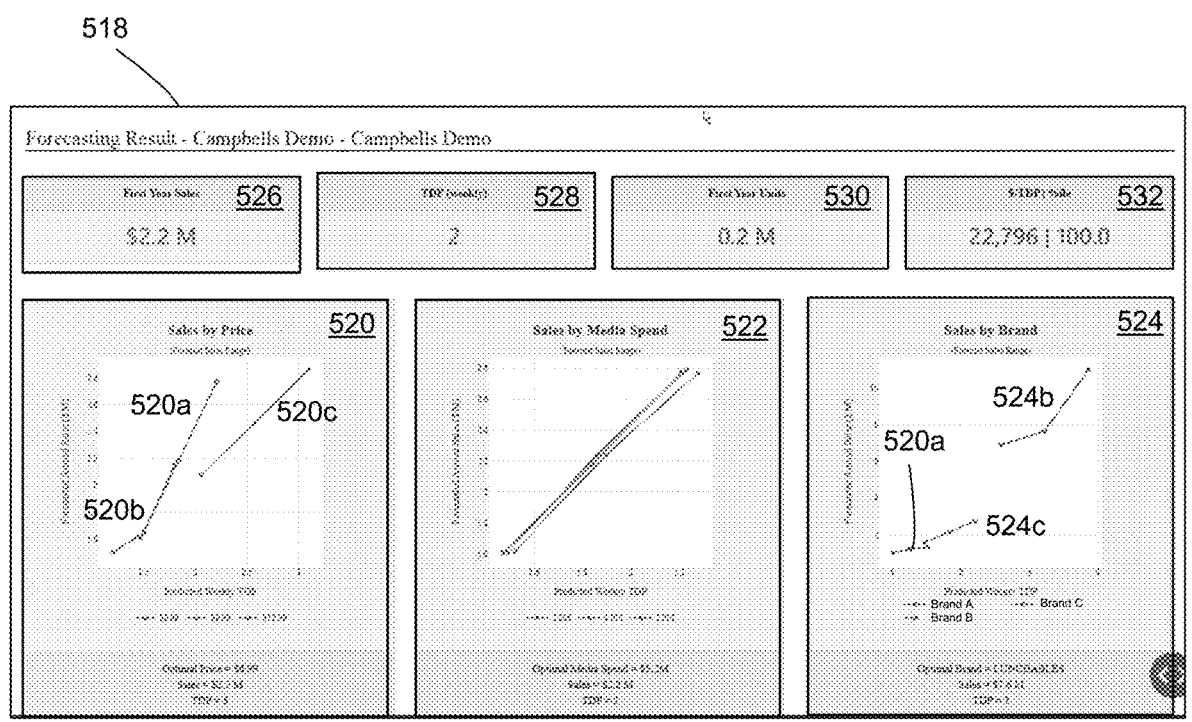
Figure 5G:
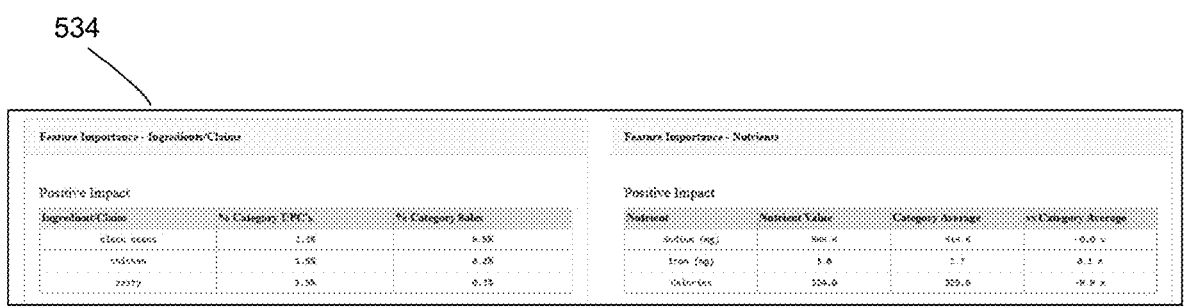

The graphical component 522 displays predicted sales value based on different media spend amounts. Moreover, the graphical component 524 predicts sales based on a brand associated with the proposed product. Specifically, the line 524a predicts sales associated with the proposed product if the proposed product is branded as brand A, the line 524b predicts sales associated with the proposed product if the proposed product is branded as brand B, and the line 524c predicts sales associated with the proposed product if the proposed product is branded as brand C. Using the performance metrics predicted and displayed within the GUI 518, the user may understand the impact of various attributes of the proposed product. In some embodiments, the user may revise one or more attributes inputted previously (e.g., input elements depicted in FIGS. 5A-5H) and the system may iteratively revise the predicted values and metrics discussed and depicted in FIG. 5F.

In addition to the GUI 518, the system may also display the GUIs 534 and 536 to indicate which factors contributed or would contribute to the predicted results and whether their contribution is positive or negative. For instance, the GUI 534 indicates the positive impact of different ingredients. Specifically, the system predicts that having chicken in the proposed product would increase the proposed product's projected sales by 0.2%. This system also predicts nutrients and their potential impact on the overall projected sales of the proposed product. For instance, the system determines that having relatively low sodium and relatively low-calorie count has a positive impact on the proposed product's predicted performance within the market. In contrast, the system may also determine which attributes of the proposed product contributed negatively, as depicted in the GUI 536.

Using the method and systems described herein, the system may be able to provide results to various "what if" scenarios. For instance, the user may change one or more attributes and determine how the proposed product would perform in the market if the price was raised or if the product was marketed under a different name, and the like. In another embodiment, the user may request that the system keeps one or more attributes constant and optimize one or more other attributes. For instance, the user may request that the branding of the product would remain as Brand A but requests the system to optimize the price, such that the sales and TDP values are higher than a certain threshold.

The system may also display the GUI 538 to display different price points and different ingredients. As depicted in FIG. 5I, the system may provide a chart indicating different ingredients that could be included in the proposed product and corresponding price points. As depicted, the system may predict that Brand X will be most successful moving forward with blubbery formulation for their breakfast bar at $1.65. In other words, a new bar (that is marketed under Brand X) will do best at $1.65/unit but can support a pricing of $1.89 if Brand X expects a forecasted sales value of $3.6 million or more.

Using the methods described herein, the system can also provide recommendations for users. For instance, as depicted in FIG. 5I, the system may recommend replacement of poorly received flavors and claims from a product by identifying which flavors are negatively impacting the proposed product. Using the methods described herein, the system may also analyze packaging (e.g., art used on the package and labeling information). Using AI models that are trained based on historical packaging data and their corresponding performance metrics, the system can predict responses to questions, such as "how much does label art drive shelf decisions in this category?" or "which label design should be used for new product launch or brand refresh?"

Figure 5J:
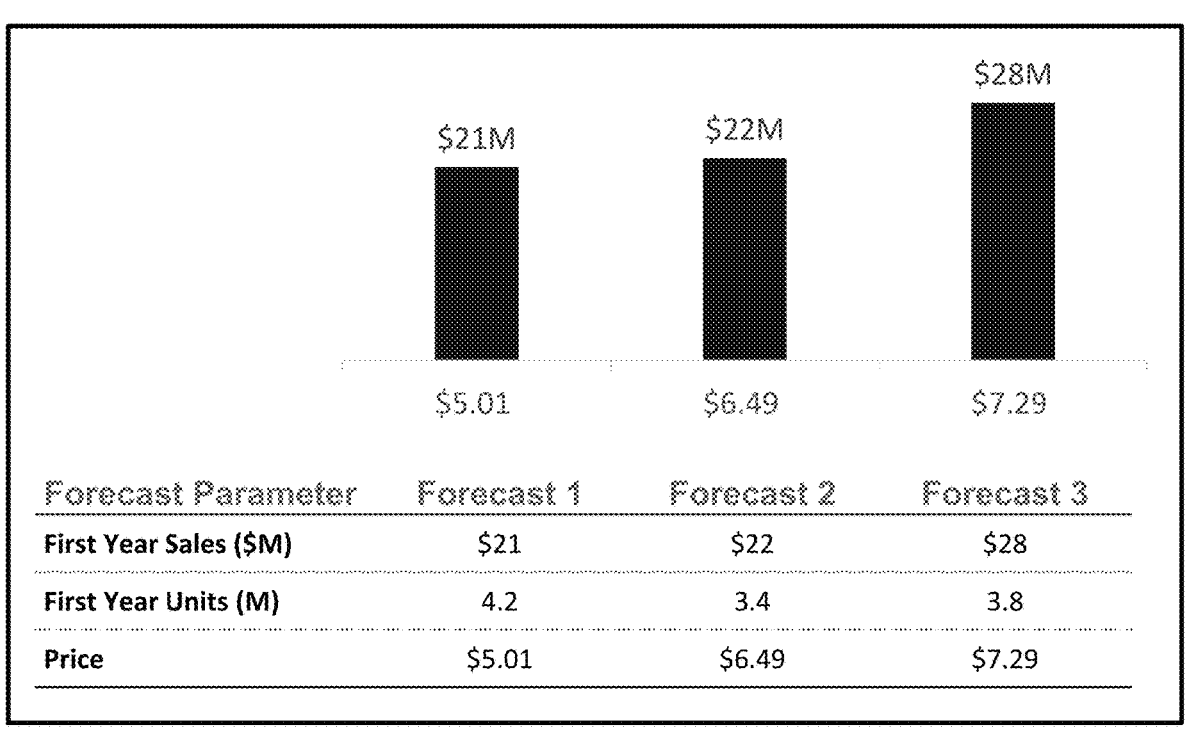

Using the methods described herein, the system can display multiple scenarios for projected product performances, as depicted in FIG. 5J. In this way, the user can view different product performance predictions when analyzed using different attributes (prices) and/or when optimized using different methods (e.g., using different platforms).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method of using a plurality of artificial intelligence (AI) sub-models to increase efficiency and explainability of an AI model trained based on segmented data for consumable products by bifurcating data dependencies, the method comprising:

receiving, by a processor, a request to generate a projected attribute indicating a market performance metric of a product within a future defined time period of the product using the plurality of AI sub-models;

receiving, by the processor, one or more attributes of the product, wherein at least one attribute is associated with nutrition;

executing, by the processor, the plurality of AI sub-models, comprising a first AI sub-model and a second AI sub-model to generate the projected attribute the plurality of AI sub-models being trained by a process comprising:

retrieving training data comprising historical products, training product attributes of the historical products, and corresponding market performance metrics;

executing a data preparation protocol to generate a training dataset, wherein executing the data preparation protocol comprises:

segmenting the training data according to categories of the historical products and corresponding departments; and generating, for each segment of the training data, a set of high impact training attributes representing ingredients that have a high impact on the corresponding market performance metrics based on determining a correlation between the training product attributes and the corresponding market performance metrics; and providing a filtered portion of the training dataset corresponding to the set of high impact training attributes to the plurality of AI sub-models to initiate training of the first AI sub-model and the second AI sub-model based on the filtered portion of the training dataset; and wherein executing the plurality of AI sub-models comprises bifurcating a generation of the projected attribute into two steps:

a first step comprising executing, by the processor, the first AI sub-model to predict a distribution value based on at least some of the set of high impact training attributes, wherein the distribution value predicts how many retailers will carry the product based on the one or more attributes of the product; and a second step comprising executing, by the processor, the second AI sub-model to ingest the distribution value predicted by the first AI sub-model and predict the projected attribute based on the distribution value determined by the first AI sub-model and at least some of the set of high impact training attributes; and presenting, by the processor, the projected attribute.

2. The method of claim 1, wherein the projected attribute is a projected sales value.

3. The method of claim 2, wherein the second AI sub-model generates a plurality of projected sub-sales values, where a first projected sub-sales value does not consider label data associated with the product and a second projected sub-sales value does not consider ingredients of the product.

4. The method of claim 3, further comprising:

transforming, by the processor using a regression protocol, the first projected sub-sales value and second projected sub-sales value into the projected sales value.

5. The method of claim 1, wherein the one or more attributes of the product correspond to at least one of a price, ingredients, labeling claims, category, brand, nutritional value, or a weight associated with the product.

6. The method of claim 1, wherein presenting the projected attribute comprises presenting, by the processor, a set of projected attributes for the product where each projected attribute corresponds to a different price of the product.

7. The method of claim 1, wherein the plurality of AI sub-models are further trained on web site data comprising of consumer reviews.

8. A system for using a plurality of artificial intelligence (AI) sub-models to increase efficiency and explainability of an AI model trained based on segmented data for consumable products by bifurcating data dependencies, the system comprising:

a server comprising a processor and a non-transitory computer-readable medium containing instructions that when executed by the processor causes the processor to perform operations comprising:

receiving a request to generate a projected attribute indicating a market performance metric of a product within a future defined time period of the product using the plurality of AI sub-models;

receiving one or more attributes of the product;

executing the plurality of AI sub-models, comprising a first AI sub-model and a second AI sub-model to generate the projected attribute, the plurality of AI sub-models being trained by a process comprising:

retrieving training data comprising historical products, training product attributes of the historical products, and corresponding market performance metrics;

executing a data preparation protocol to generate a training dataset, wherein executing the data preparation protocol comprises:

segmenting the training data according to categories of the historical products and corresponding departments; and generating, for each segment of the training data, a set of high impact training attributes representing ingredients that have a high impact on the corresponding market performance metrics based on determining a correlation between the training product attributes and the corresponding market performance metrics; and providing a filtered portion of the training dataset corresponding to the set of high impact training attributes to the plurality of AI sub-models to initiate training of the first AI sub-model and the second AI sub-model based on the filtered portion of the training dataset; and wherein executing the plurality of AI sub-models comprises bifurcating a generation of the projected attribute into two steps:

a first step comprising executing, by the processor, the first AI sub-model to predict a distribution value based on at least some of the set of high impact training attributes, wherein the distribution value predicts how many retailers will carry the product based on the one or more attributes of the product; and a second step comprising executing, by the processor, the second AI sub-model to ingest the distribution value predicted by the first AI sub-model and predict the projected attribute based on the distribution value determined by the first AI sub-model and at least some of the set of high impact training attributes; and presenting the projected attribute.

9. The system of claim 8, wherein the projected attribute is a projected sales value.

10. The system of claim 9, wherein the second AI sub-model generates a plurality of projected sub-sales values, where a first projected sub-sales value does not consider a label data associated with the product and a second projected sub-sales value does not consider ingredients of the product.

11. The system of claim 10, wherein the instructions further cause the processor to:

transform, using a regression protocol, the first projected sub-sales value and second projected sub-sales value into the projected sales value.

12. The system of claim 8, wherein the one or more attributes of the product correspond to at least one of a price, ingredients, labeling claims, category, brand, nutritional value, or a weight associated with the product.

13. The system of claim 8, wherein presenting the projected attribute comprises presenting, by the processor, a set of projected attributed for the product where each projected attribute corresponds to a different price of the product.

14. The system of claim 8, wherein the plurality of AI sub-models are further trained on web site data comprising of consumer reviews.

* * * * *